(12) United States Patent
Grose et al.

(10) Patent No.: US 7,946,416 B2
(45) Date of Patent: May 24, 2011

(54) RETRACTABLE TRANSFER CONVEYOR

(75) Inventors: James E. Grose, Clive (CA); Cory E. Grose, Clive (CA); Darren J. Grose, Clive (CA)

(73) Assignee: Rodono Industries Ltd., Clive, Alberta (CA)

( * ) Notice: Subject to any disclaimer, the term of this patent is extended or adjusted under 35 U.S.C. 154(b) by 86 days.

(21) Appl. No.: 12/603,924

(22) Filed: Oct. 22, 2009

(65) Prior Publication Data
US 2010/0108470 A1 May 6, 2010

Related U.S. Application Data

(60) Provisional application No. 61/110,343, filed on Oct. 31, 2008, provisional application No. 61/161,791, filed on Mar. 20, 2009.

(51) Int. Cl.
*B65G 21/10* (2006.01)
(52) U.S. Cl. ........................ 198/671; 198/312
(58) Field of Classification Search ................. 198/671, 198/312–320
See application file for complete search history.

(56) References Cited

U.S. PATENT DOCUMENTS

| | | | | |
|---|---|---|---|---|
| 2,558,006 A | * | 6/1951 | Shriver et al. | 198/671 |
| 3,253,695 A | * | 5/1966 | Gooding | 198/530 |
| 3,346,092 A | * | 10/1967 | Bowden et al. | 198/860.4 |
| 3,575,306 A | * | 4/1971 | Obermeyer et al. | 414/523 |
| 4,714,149 A | * | 12/1987 | Tiede | 198/312 |
| 4,963,066 A | | 10/1990 | Boppart | |
| 5,184,715 A | | 2/1993 | Feterl | |
| 5,305,866 A | | 4/1994 | Stewart et al. | |
| 5,498,119 A | * | 3/1996 | Faivre | 414/528 |
| 5,788,055 A | * | 8/1998 | Stewart et al. | 198/671 |
| 6,591,974 B2 | * | 7/2003 | Tofin et al. | 198/671 |
| 7,191,889 B1 | | 3/2007 | Heley | |
| 7,381,131 B1 | | 6/2008 | Harpole | |
| 7,644,816 B2 | * | 1/2010 | Veiga Leal et al. | 198/671 |
| 2006/0193717 A1 | | 8/2006 | Waldner | |

FOREIGN PATENT DOCUMENTS

| | | |
|---|---|---|
| CA | 1137915 | 12/1982 |
| CA | 2398015 | 2/2004 |

* cited by examiner

*Primary Examiner* — Mark A Deuble
(74) *Attorney, Agent, or Firm* — Ade & Company Inc.; Ryan W. Dupuis; Kyle R. Satterthwaite

(57) ABSTRACT

A transfer conveyor comprises a transfer tube supporting a transfer auger rotatably therein and a transfer drive mechanism arranged to drive rotation of the transfer auger so as to convey material from the inlet opening to the outlet opening of the transfer tube. A collector housing, typically in the form of a hopper, is supported for relative sliding movement along the transfer tube between an extended position in which the collector housing communicates with the outlet opening of the transfer tube and a retracted position in which the collector housing is closer to the inlet end of the transfer tube than in the extended position. Mounting of the collector housing on the inlet end of an implement, for example an agricultural conveyor, permits the inlet end of the transfer conveyor to be extended and retracted relative to the implement.

20 Claims, 12 Drawing Sheets

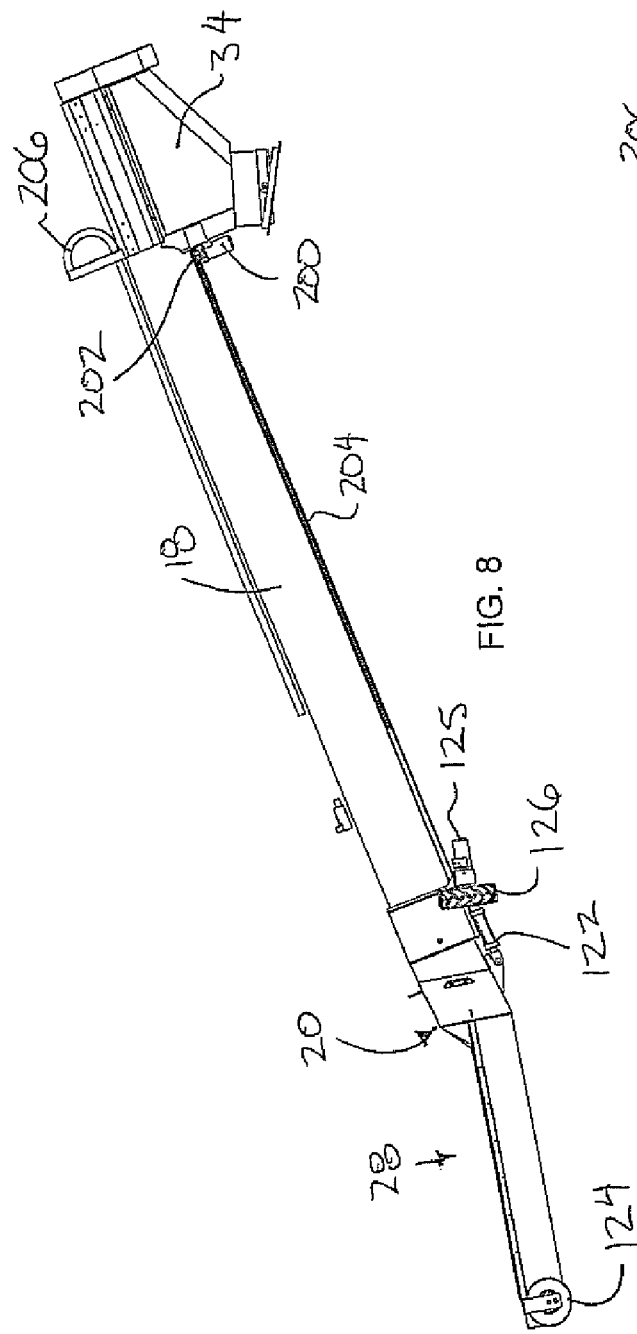
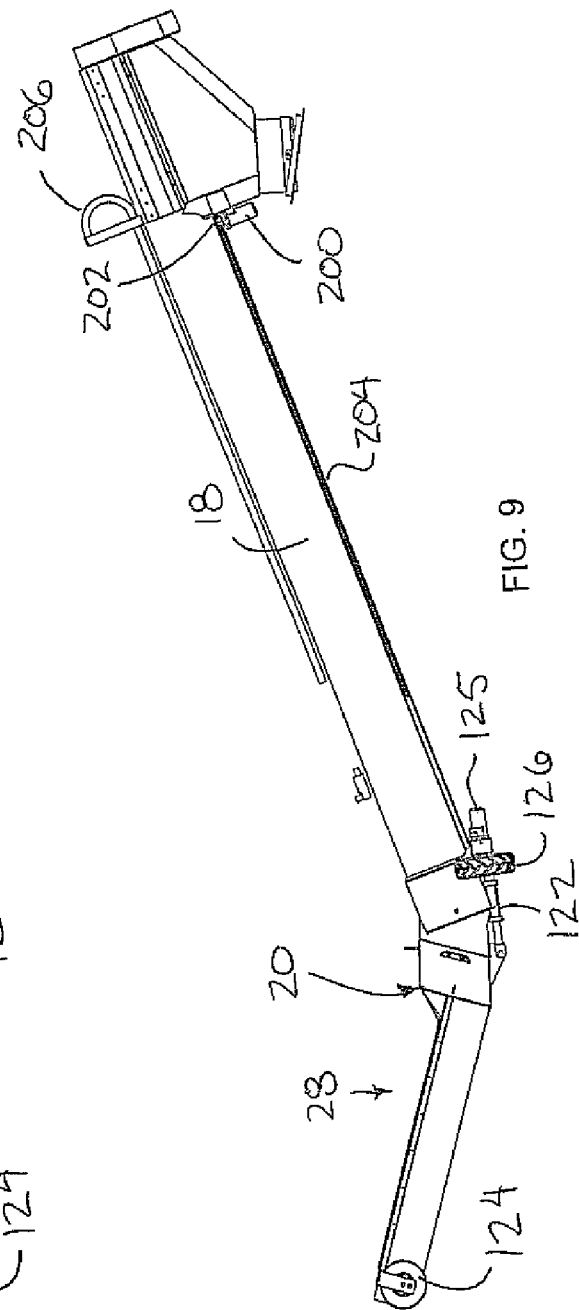
FIG. 8
FIG. 9

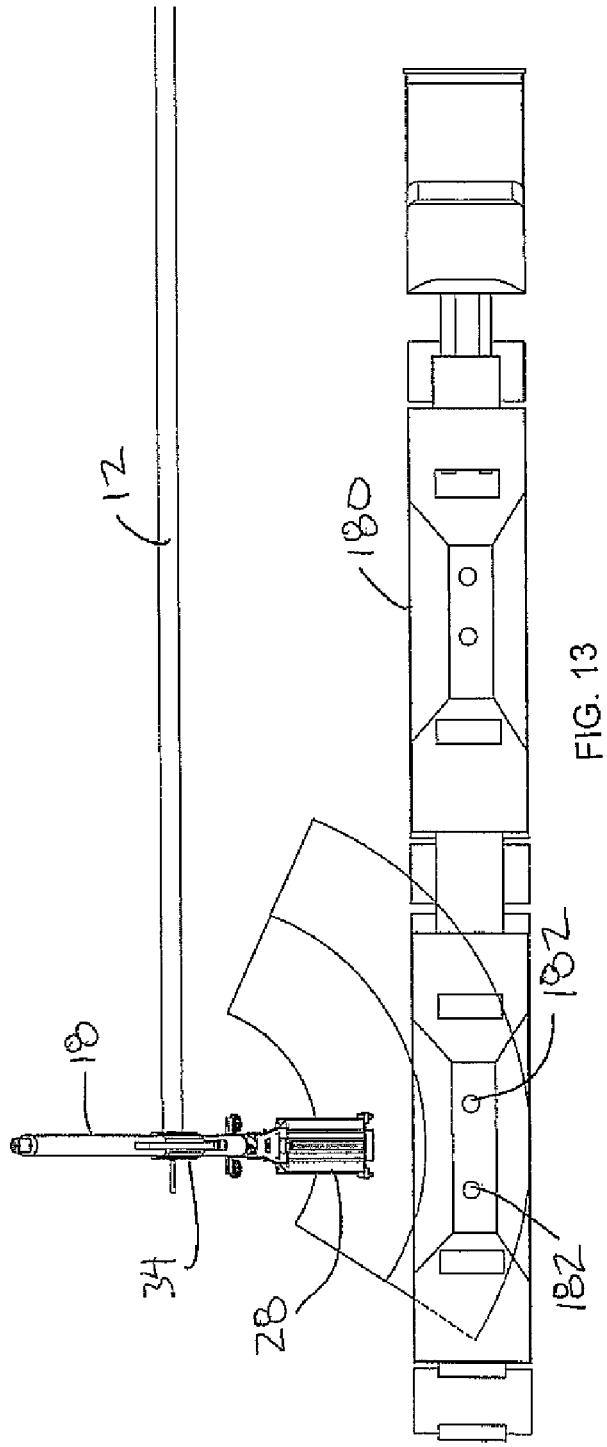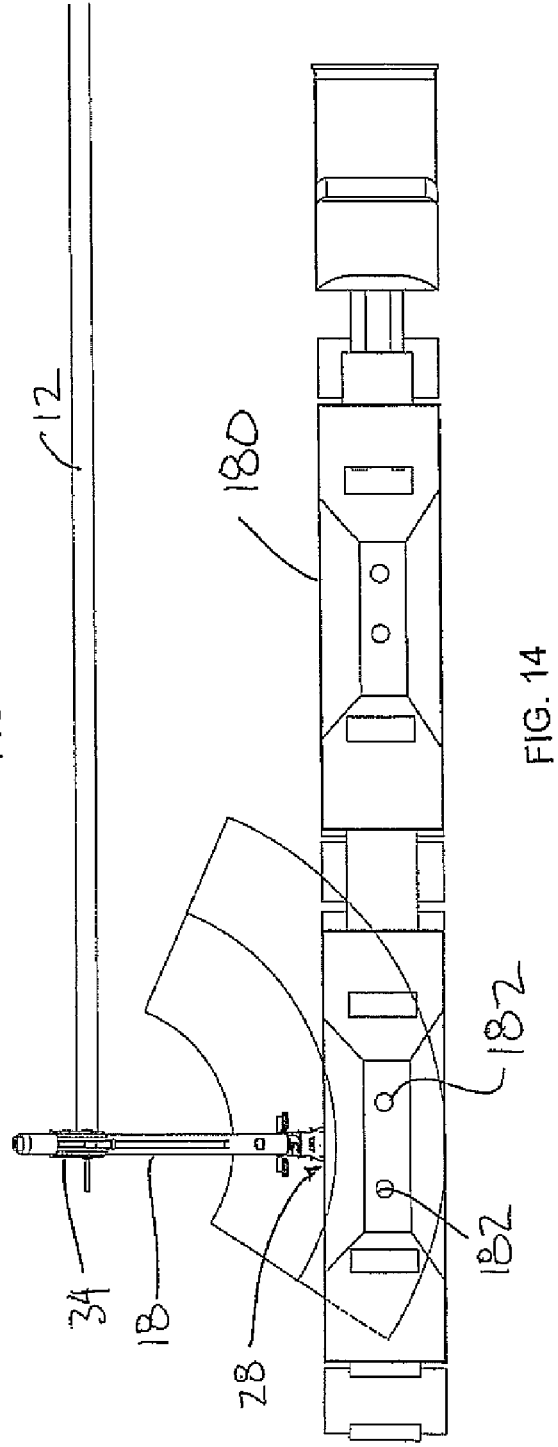

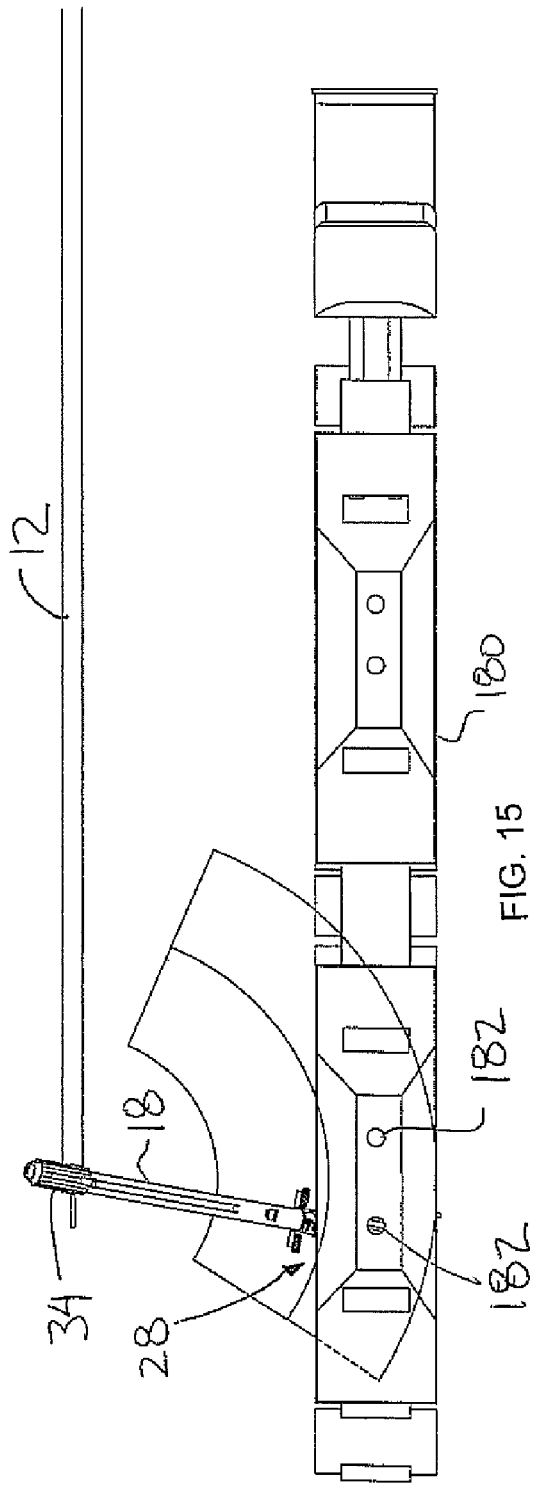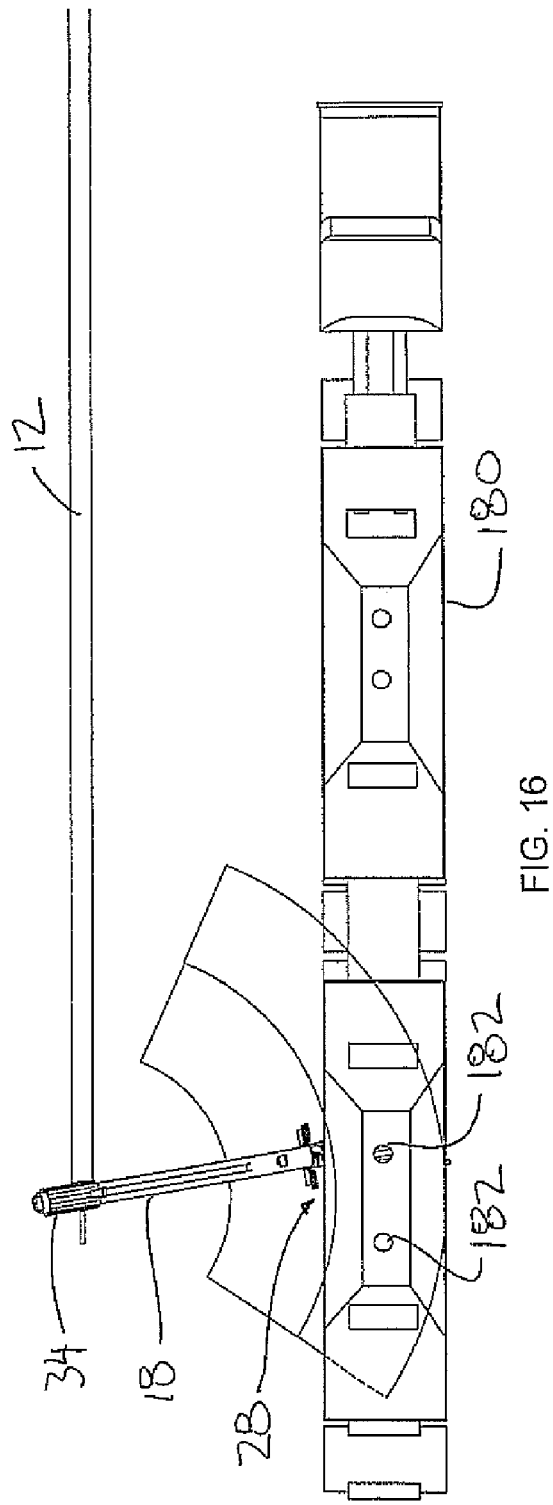

RETRACTABLE TRANSFER CONVEYOR

This application claims the benefit under 35 U.S.C. 119(e) of U.S. provisional application Ser. No. 61/110,343, filed Oct. 31, 2008 and U.S. provisional application Ser. No. 61/161,791, filed Mar. 20, 2009.

FIELD OF THE INVENTION

The present invention relates to a retracting auger for transferring dry particulate matter from transport or storage containers to augers or other conveyor mechanisms.

BACKGROUND

Augers and belt conveyors are commonly used to move dry matter such as grain, fertilizer, and feed material between storage and transport containers. Recently there has been an increase in the use of large augers and hopper bottom highway trailers by grain growers. Hopper bottom trailers being designed for unloading at large handling facilities introduce some handling problems at the growers level because the storage containers may not be located in one location and it may be necessary to unload hopper bottom trailers at many different locations. The initial solution to doing this was using a swinging transfer auger to take the material from the bottom of the trailer to the bottom of the main auger. The main auger then transfers the material into the storage bin. The main difficulty with this solution is that the swinging auger must be moved under the trailer while the trailer is driving alongside the auger into position. This requires 2 people, one to drive, one to swing the transfer auger. This is prone to accidents if there is miscommunication between the 2 people or if there is not enough clearance or the ground is too rough, the hopper on the transfer auger often gets run over. As the size of the augers continues to increase it compounds the problem as the transfer auger becomes too heavy for one person to move. There have been inventions to drive the wheels on the swing auger to make the task of swinging the auger easier. There have also been inventions for remote control of the drive on the wheels of the transfer auger to make it possible for one person to swing the auger under the trailer while driving. The solution is still not ideal because it is very difficult to see and effectively control something that far behind the driver. Another solution is to use a belt conveyor that can be extended under the trailer after the trailer is in place. The belt conveyor is retracted before the trailer is moved. It can swing as well to pick up more than one hopper without moving the trailer if required. Operationally this is a very good solution because large capacity is possible; the task can easily be done by one person with mechanical assists, and the transfer conveyor can be extended after the trailer is in place, reducing the risk of injury and damage. However, mechanically it is expensive to build a belt conveyor compared to a screw conveyor (auger) and the cost is multiplied by adding the mechanisms required to make an extending, retracting, (telescoping) belt conveyor.

Canadian Patent 2398015 is an apparatus to accomplish the same function, but it does so with a belt conveyor, and is telescoping in that it is functional at any point in its travel.

Canadian Patent 1137915 is an apparatus that could be used to accomplish the same function. It is an extensible or telescoping auger which is also functional at any point in its travel. It references other extensible auger patents as well.

U.S. Pat. No. 7,381,131 is an apparatus that is an extendable auger, however its outlet moves and inlet is fixed, so it is somewhat telescoping in that it can function over a significant portion of its travel, however it is similar to our invention in that if it were to travel too far it would not function, ie the material would be deposited in the wrong place. It also uses telescoping casings.

SUMMARY OF THE INVENTION

According to one aspect of the invention there is provided a transfer conveyor comprising:

a transfer tube extending in a longitudinal direction between an inlet opening at an inlet end of the transfer tube and an outlet opening at an outlet end of the transfer tube;

a transfer auger supported in the transfer tube for rotation about a longitudinal axis extending in the longitudinal direction of the transfer tube;

a transfer drive mechanism arranged to drive rotation of the transfer auger about the longitudinal axis relative to the transfer tube so as to convey material from the inlet opening to the outlet opening of the transfer tube responsive to an input rotation;

a collector housing comprising a passage extending therethrough from an inlet opening to an outlet opening;

the collector housing being supported for relative sliding movement along the transfer tube in the longitudinal direction of the transfer tube between an extended position in which the inlet opening of the collector housing communicates with the outlet opening of the transfer tube and a retracted position in which the collector housing is closer to the inlet end of the transfer tube than in the extended position.

By providing a transfer auger and a transfer tube which together are slidable relative to a collector housing that communicates with the outlet opening of the tube, a simple mechanism is provided which can be readily attached to a large agricultural conveyor such that the transfer conveyor is readily retractable to assist in positioning of the inlet of the transfer conveyor relative to an unloading source of particulate material.

The primary function of the transfer conveyer is that it retracts and extends. The primary components of the apparatus are:

a screw conveyor with a drive system, an inlet and an outlet;

a collector housing to receive matter from the outlet of the screw conveyor when the outlet is positioned inside of the collector housing; and a linear drive system to move the screw conveyor relative to the upper housing.

Preferably the transfer auger is fixed in the longitudinal direction relative to the transfer tube.

Preferably there is provided an inlet hopper having an open top end arranged to receive material therein and an outlet in communication with the inlet opening of the transfer tube in which the auger is fixed in the longitudinal direction relative to the inlet hopper.

Preferably the collector housing has a length spanning in the longitudinal direction which is greater than the outlet opening of the transfer tube and the inlet opening of the collector housing is longer in the longitudinal direction than the outlet opening of the transfer tube.

The collector housing preferably comprises:

a mounting portion supported on the transfer tube for sliding movement along the transfer tube in the longitudinal direction, the mounting portion locating the inlet opening of the collector housing so as to be arranged for alignment with the outlet opening of the transfer tube; and a hopper portion defining the passage of the collector housing extending downwardly from the inlet opening in the sleeve portion to the outlet opening at a bottom end of the hopper portion.

In some embodiments, one of: i) the mounting portion of the collector housing, and ii) the transfer tube received therein, includes a key extending in the longitudinal direction, and the other one of: i) the mounting portion of the collector housing, and ii) the transfer tube, includes a keyway extending in the longitudinal direction which receives the key therein for relative sliding in the longitudinal direction between the extended and the retracted positions.

Preferably there is provided an inlet hopper having an open top end arranged to receive material therein and an outlet in communication with the inlet opening of the transfer tube. The inlet hopper may be coupled to the transfer tube for relative rotation about the longitudinal axis of the transfer auger.

Preferably the inlet hopper is arranged to be supported for rolling movement along the ground in the longitudinal direction of the transfer tube, as well as being arranged to be supported for rolling movement along the ground in a lateral direction oriented substantially perpendicularly to the longitudinal direction of the transfer tube.

In a preferred embodiment the inlet hopper is supported on a first set of wheels for rolling movement along the ground in the longitudinal direction of the transfer tube and on a second set of wheels for rolling movement along the ground in a lateral direction oriented substantially perpendicularly to the longitudinal direction of the transfer tube in which there is provided an actuator supported on the inlet hopper which is operable between a first position in which the inlet hopper is supported for rolling movement on the first set of wheels and a second position in which the inlet hopper is supported for rolling movement on the second set of wheels. The first and second sets of wheels may be supported near opposing ends of the inlet hopper and the inlet hopper may be supported on the transfer tube for relative pivotal movement about a generally horizontal actuator axis between the first and second positions.

Preferably the outlet opening of the transfer tube is located on a bottom side of the transfer tube.

In some embodiments the transfer drive mechanism is arranged to communicate with the transfer auger at the outlet end of the transfer tube.

In one embodiment there is provided an auxiliary motor coupled to the transfer drive mechanism to provide the input rotation to the transfer drive mechanism.

In a preferred embodiment when the transfer conveyor is used in combination with a main conveyor comprising a main auger rotatable within a main auger tube to convey material upwardly from an inlet end to an outlet end of the main conveyor, the collector housing is arranged to be coupled to the input end of the main conveyor and the transfer drive mechanism is arranged to be coupled to the main auger of the main conveyor such that the input rotation of the transfer drive mechanism comprises a rotation of the main auger.

In this instance, the transfer drive mechanism may comprise a first mating connector coupled for rotation with the transfer auger and a second mating connector coupled for rotation with the main auger and which is movable together with the collector housing relative to the transfer tube. The first and second mating connectors are preferably coupled for rotation together in the extended position of the transfer tube and slidable relative to one another between the extended position and retracted position of the collector housing.

More particularly, the transfer drive mechanism may comprise a first mating joint and connector coupled for rotation with the main auger which often has a vertical drive shaft inside the main auger inlet with an angle gearbox situated with the input near vertical and an output shaft parallel to the transfer auger tube. The gearbox output shaft is coupled to a tube and mating connector that can receive and mate a drive shaft located on the transfer auger which is movable together with the transfer tube relative to the collector. The tube and mating connector and transfer auger drive shaft are preferably coupled for rotation together in the extended position of the transfer tube and slidable relative to one another between the extended position and a partially retracted position of the collector housing.

The tube and second mating connector may be movable together with the collector housing relative to the first mating connector and transfer auger drive shaft between the extended position in which the tube and first and second mating connectors are in an engaged position within one another and a retracted position in which the first and second mating connectors are disengaged with one another in a disengaged position such that the main auger is rotatable independently of the transfer auger.

A distance between the collector housing and the inlet end of the transfer tube in the retracted position is preferably approximately 40 to 75% of a distance between the collector housing and the inlet end of the transfer tube in the extended position.

In some embodiments there is provided a linear actuator arranged to displace the transfer tube relative to the collector housing between the extended position and the retracted position of the transfer conveyor in which the linear actuator extends in the longitudinal direction of the transfer tube along the top side or bottom side of the transfer tube. The linear actuator may comprise a hydraulic piston cylinder having a piston end coupled to one of the transfer tube and the collector housing and a cylinder end coupled to the other one of the transfer tube and the collector housing at two positions spaced apart from one another in the longitudinal direction.

Alternatively, there may be provided a sliding actuator comprising a rack extending along the transfer tube, a pinion supported rotatable on the collector housing in meshing engagement with the rack, and a motor arranged to drive rotation of the pinion relative to the collector housing to displace the collector housing along the transfer tube between the extended position and the retracted position.

When the transfer conveyor is used in combination with a main conveyor supported by a wheeled frame for rolling movement along the ground, the main conveyor extending upwardly from an inlet opening to an outlet opening, preferably the outlet opening of the collector housing is coupled to communicate with the inlet opening of the main conveyor for relative pivotal movement about an upright axis and for relative pivotal movement about a substantially horizontal axis.

Preferably the transfer tube and the transfer auger are slidable together in the longitudinal direction relative to the collector housing and the main conveyor.

Preferably the collector housing is supported on the main conveyor such that the transfer tube is slidable in the longitudinal direction of the transfer tube which extends upwardly at an incline from the inlet end to outlet end.

One embodiment of the invention will now be described in conjunction with the accompanying drawings in which:

BRIEF DESCRIPTION OF THE DRAWINGS

FIG. 8 is a side elevational view of the inlet hopper in a retracting mode according to the second embodiment of the transfer conveyor in the extended position.

FIG. 9 is a side elevational view of the inlet hopper in a swing mode according to the second embodiment of the transfer conveyor in the extended position.

FIGS. 13 through 16 are top plan views of various positions of the transfer conveyor for conveying material from a discharge of a trailer to the inlet of a main conveyor alongside the trailer.

In the drawings like characters of reference indicate corresponding parts in the different figures.

DETAILED DESCRIPTION

This invention discloses a transfer conveyor that extends and retracts using a screw conveyor (auger). The invention is comprised primarily of a main transfer screw conveyor, an upper collector, and a linear drive mechanism. It may also include various pivots and swivels as required to attach the invention to collection systems and to the main conveyor. The main transfer screw conveyor has a discharge hole located at the bottom of the tube a set distance from the upper end. The screw is driven from the upper end through any rotational drive method, including but not limited to a hydraulic motor, PTO shafts, chains and belts, electric motors or a suitable drive transfer mechanism for transferring drive from a main conveyor upon which the transfer conveyor is supported.

The main transfer screw conveyor slides inside an upper collector housing. The upper collector housing is formed to collect discharge from the main transfer screw conveyor and direct it into the main screw conveyor that feeds into the destined container. The upper collector allows some movement of the main transfer conveyor without disrupting flow. The movement allowed should at least be enough to unload from two hoppers on the same trailer without moving the truck. The upper collector also allows complete movement of the main transfer conveyor up to the maximum travel of the linear drive mechanism. The intent of this movement is to retract the main transfer screw conveyor enough to move the trailer into or out of place easily. The screw should not be driven in the retracted position as matter will likely be transferred onto the ground through the discharge hole at the upper end.

The linear drive mechanism is used to move the main transfer conveyor within the upper collector. The movement can be driven by any linear motion mechanism including, but not limited to hydraulic displacement cylinder, rack and pinion, friction roller, threaded screw, chain or cable drive. Antifriction and anti-rotation elements can be added and may be necessary depending on the type of drive used. An additional pivot may be used along with the lower swivel which will allow shorter lengths to be built while still keeping the hopper low enough to fit under the highway trailer. The diameter and length of the apparatus is largely determined by the size and configuration of the main conveyor the transfer conveyor is mated to.

Figure 1:
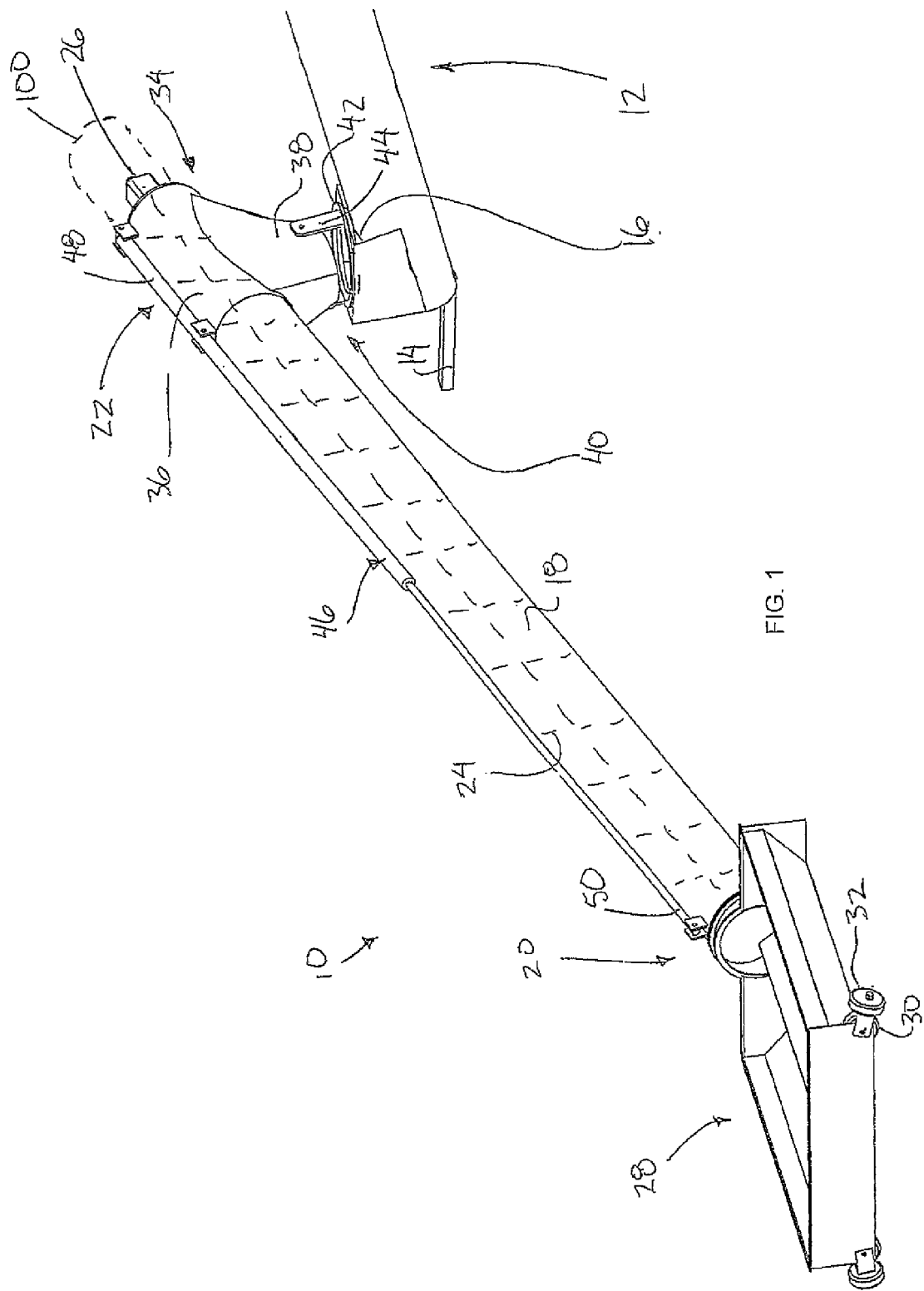
FIG. 1 is a perspective view from an inlet end of the transfer conveyor in an extended position according to a first embodiment.
Figure 3:
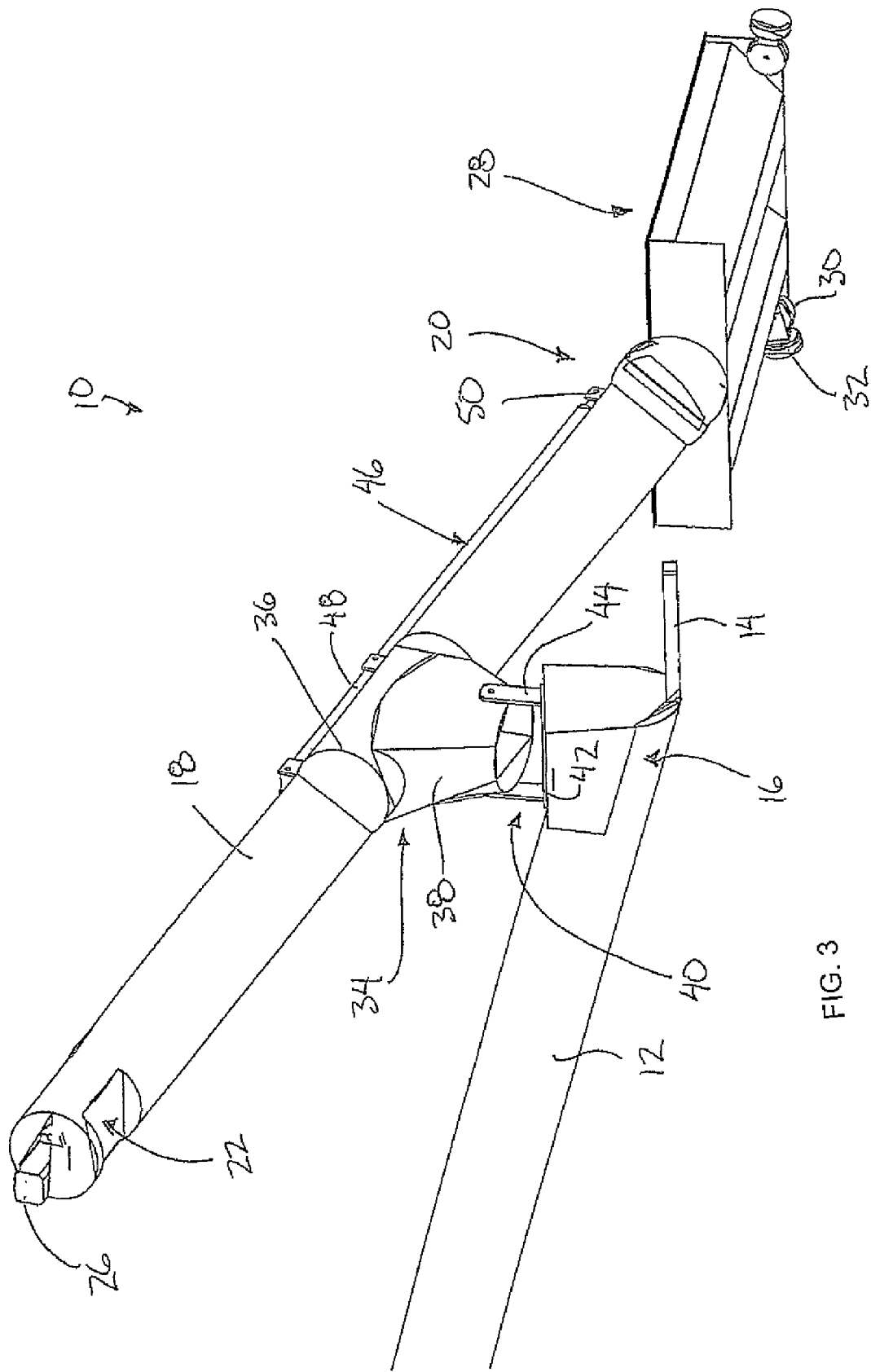
FIG. 3 is a perspective view from an outlet end of the transfer conveyor according to FIG. 1 in the retracted position.
Figure 4:
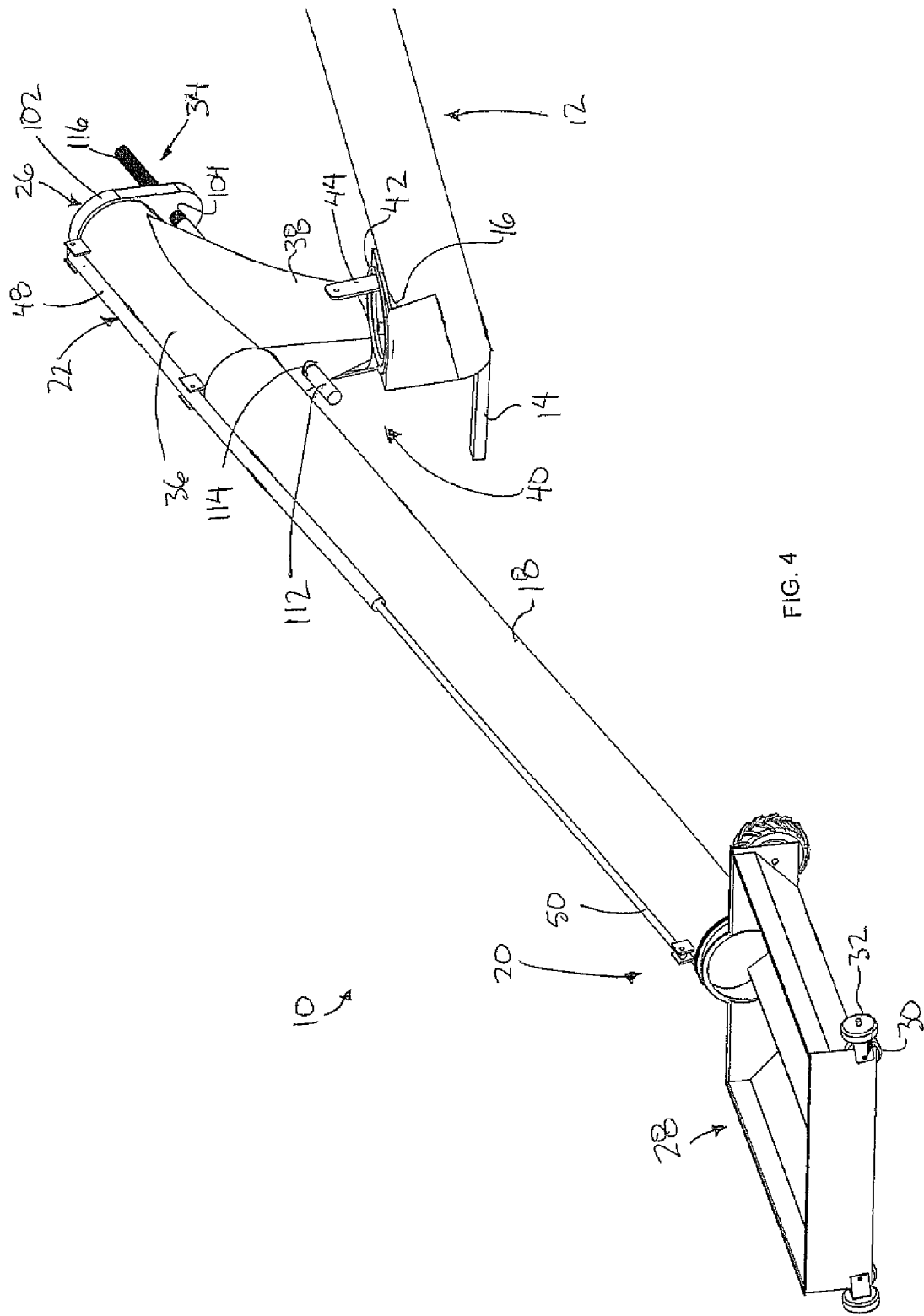
FIG. 4 is a perspective view from an inlet end of the transfer conveyor according to a second embodiment.
Figure 5:
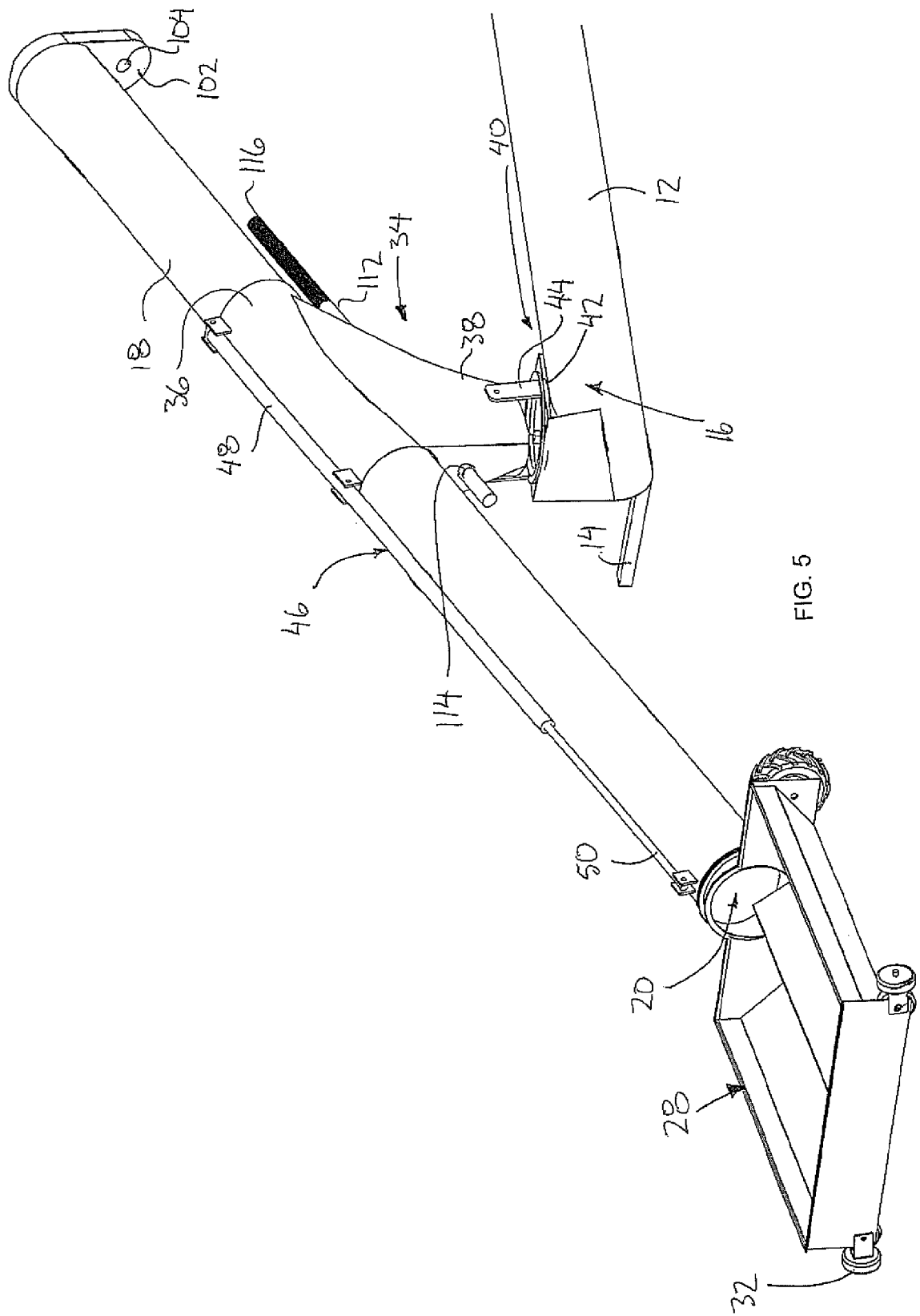
FIG. 5 is an alternate perspective view from the inlet end of the transfer conveyor according to FIG. 4 in a partially retracted position.
Figure 6:
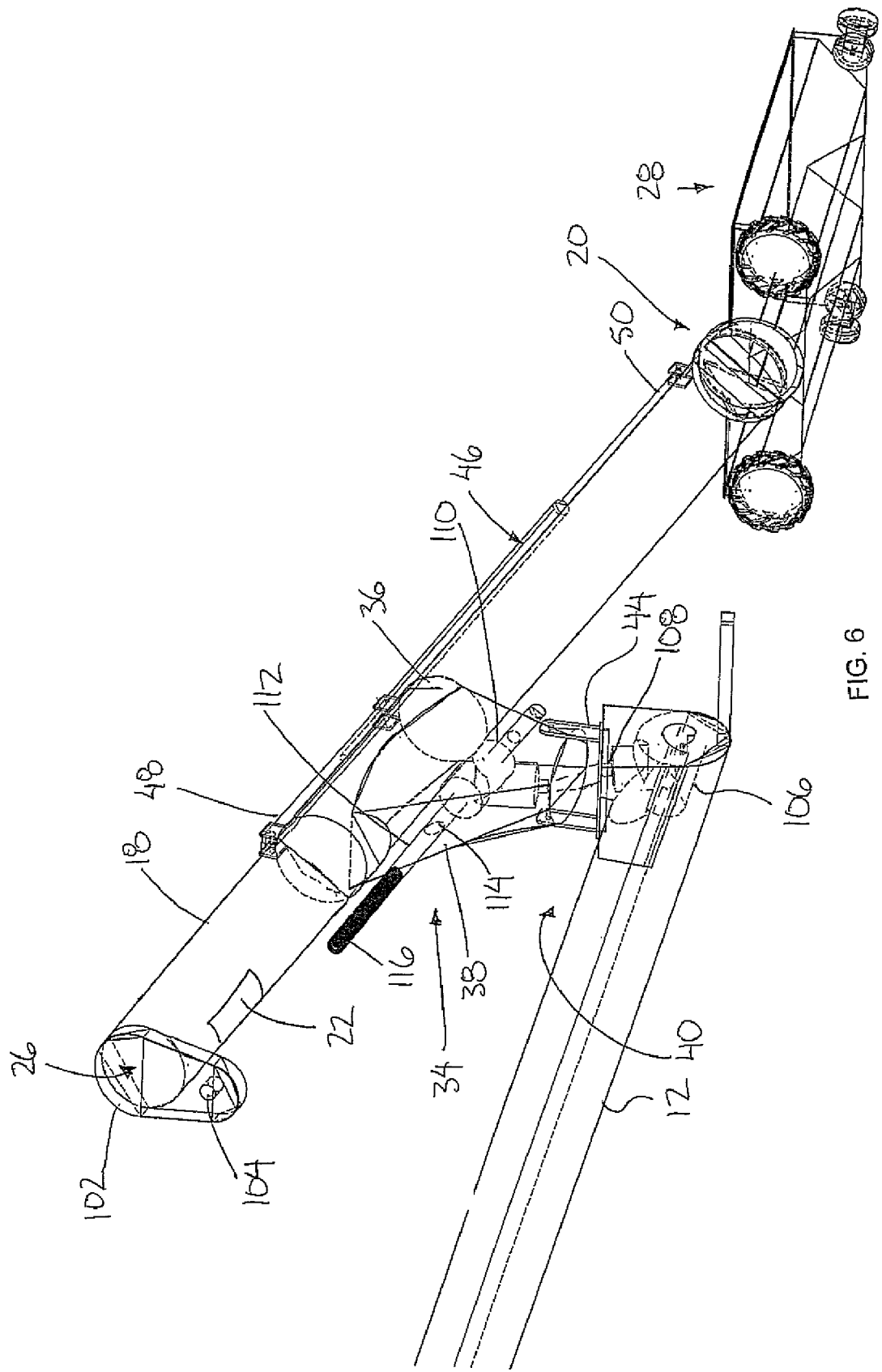
FIG. 6 is a perspective view from an outlet end of the transfer conveyor according to FIG. 4 in a partially retracted position.

The present embodiment of the invention is comprised of a main transfer screw conveyor driven by a hydraulic motor at the upper end as shown in FIG. 1 or by a drive transfer mechanism as shown in FIG. 4. The main transfer screw conveyor has an inlet at the lower end to receive material from the hopper system and an outlet located on the bottom side at the upper end. This is shown in FIGS. 3 and 6 as the discharge opening 22.

A hopper system is attached to the main transfer screw conveyor via a swivel that allows the hopper to be turned relative to the main transfer screw conveyor to accommodate rough ground and facilitate fastening in a transport position. An upper collector housing with a cylindrical hole through it receives the main transfer screw conveyor. The upper collector housing receives matter from the main transfer screw conveyor through the discharge opening when the apparatus is near the fully extended condition. The upper collector housing allows some linear movement during operation as well as full retraction as driven by a hydraulic displacement cylinder. The linear drive in this embodiment is a hydraulic displacement cylinder. This will allow the conveyor to retract to one half of its full length. The cylinder is fastened such that it becomes an anti rotation element which keeps the discharge opening on the bottom side of the conveyor. The upper collector housing is mounted to a main screw conveyor with a rotating flange and pivot that allows the assembly to swing as will as pivot in the vertical direction as it is being extended or retracted. The illustrated embodiments have fixed wheels to allow swinging and wheels that lock down when retracting is required. Those skilled at the art could arrange any number of wheel or roller systems to facilitate the motion of swinging and retracting.

The present invention is meant to be functional only near its fully extended position. Near its fully extended position it does allow travel, as determined by the size of the collector housing, relative to the size and position of the discharge opening in the main transfer screw conveyor.

With further reference to the drawings, the invention will now be described in further detail. Although various embodiments are illustrated in the accompanying figures, the common features will first be described herein.

As described herein a transfer conveyor 10 is provided, which according to the illustrated embodiments is suited for use with a main agricultural conveyor 12 of the type which is typically supported on a wheeled frame for towing by a towing vehicle using a hitch 14 at an inlet end of the conveyor 12. The conveyor extends at an upward incline from an inlet end 16 to an outlet end where the particulate material is discharged to a target area.

The transfer conveyor 10 comprises a transfer tube 18 which is generally cylindrical and elongate in a longitudinal direction, extending at an upward including from an inlet opening 20 at an inlet end to an outlet opening 22 at an outlet end. The outlet opening is located on a bottom side of the transfer tube at the outlet end in use.

A transfer auger 24 is positioned within the transfer tube 18 for rotation relative to the surrounding tube about a longitudinal axis of the auger which extends in the longitudinal direction of the transfer tube. The transfer auger 24 comprises a screw which is driven to rotate for conveying particulate material from the inlet end to the outlet end of the transfer tube 18.

A drive coupling 26 extends in the axial direction of the transfer auger 24 from the central axis of the auger through the outlet end of the tube for connection to a suitable rotary motor or a drive transfer member for driving the rotation of the auger. The drive coupling 26 is a transfer drive mechanism arranged to drive rotation of the transfer auger about the longitudinal axis relative to the transfer tube so as to convey material from the inlet opening to the outlet opening of the transfer tube responsive to an input rotation from an attached motor, or from an associated implement such as the main agricultural conveyor 12 for example.

An inlet hopper 28 is supported at the inlet end of the transfer tube for introducing particulate material into the transfer tube. The inlet hopper includes an open top end arranged to receive the particulate material therein and an outlet at one end of the hopper. Feed augers in the inlet hopper are arranged for communicating the particulate material received therein through the open top end to the inlet opening at the inlet end of the transfer tube in communication with the hopper outlet. The inlet hopper 28 is typically coupled to the transfer tube for relative pivotal movement about the longitudinal axis of the transfer tube.

A set of first wheels 30 support the inlet hopper for rolling movement along the ground in a side to side movement which is generally perpendicular to the longitudinal direction of the tube in an arc shaped path about a vertical pivot axis at the outlet end of the transfer tube in an operating position of the transfer conveyor. A second set of wheels 32 are selectively engagable between the inlet hopper and the ground to alternatively support the inlet hopper for rolling movement along the ground generally in the longitudinal direction of the transfer tube as may be desired.

A collector housing 34 is supported on the transfer tube 18 for relative sliding movement therebetween in the longitudinal direction of the transfer tube. The collector housing 34 comprises a sleeve portion 36 which surrounds the transfer tube to slidably receive the transfer tube therethrough for relative sliding movement in the longitudinal direction. The sleeve portion 36 locates an inlet opening of the collector housing in a bottom side thereof for selective alignment with the outlet opening of the transfer tube. The inlet opening of the collector housing is longer in the longitudinal direction than the outlet opening of the transfer tube so that the inlet opening of the collector housing can be aligned with the outlet opening of the transfer tube through a range of positions displaced in the longitudinal direction relative to one another.

The collector housing further comprises a hopper portion 38 defining a through passage in the collector housing which extends downwardly from the inlet opening in the sleeve portion to an outlet opening of the collector housing located at the bottom end of the hopper portion. The hopper portion spans the length of the inlet opening in the sleeve portion and tapers downwardly and inwardly therefrom to be reduced in dimension towards the outlet opening at the bottom end thereof. The hopper portion and the sleeve portion are fixed together for movement relative to the transfer tube.

A pivot assembly 40 is provided for coupling the collector housing 34 to the inlet end of the main conveyor 12. The pivot assembly 40 comprises a swivel 42 which supports the collector housing for pivotal movement about a vertical axis relative to the main conveyor upon which it is supported. The pivot assembly 40 further comprises a pair of posts 44 at diametrically opposed positions on the swivel 42 for pivotally coupling to opposing sides of the hopper portion 38 of the collector housing to provide a hinge coupling for relative pivotal movement between the collector housing and the main conveyor about a horizontal axis extending between the two posts 44. The pivot assembly 40 serves to locate the hopper portion directly above the inlet opening at the inlet end of the main conveyor 12 such that the collector housing is arranged to discharge particulate material received from the transfer tube 18 downwardly into the inlet opening of the main conveyor 12.

Figure 2:
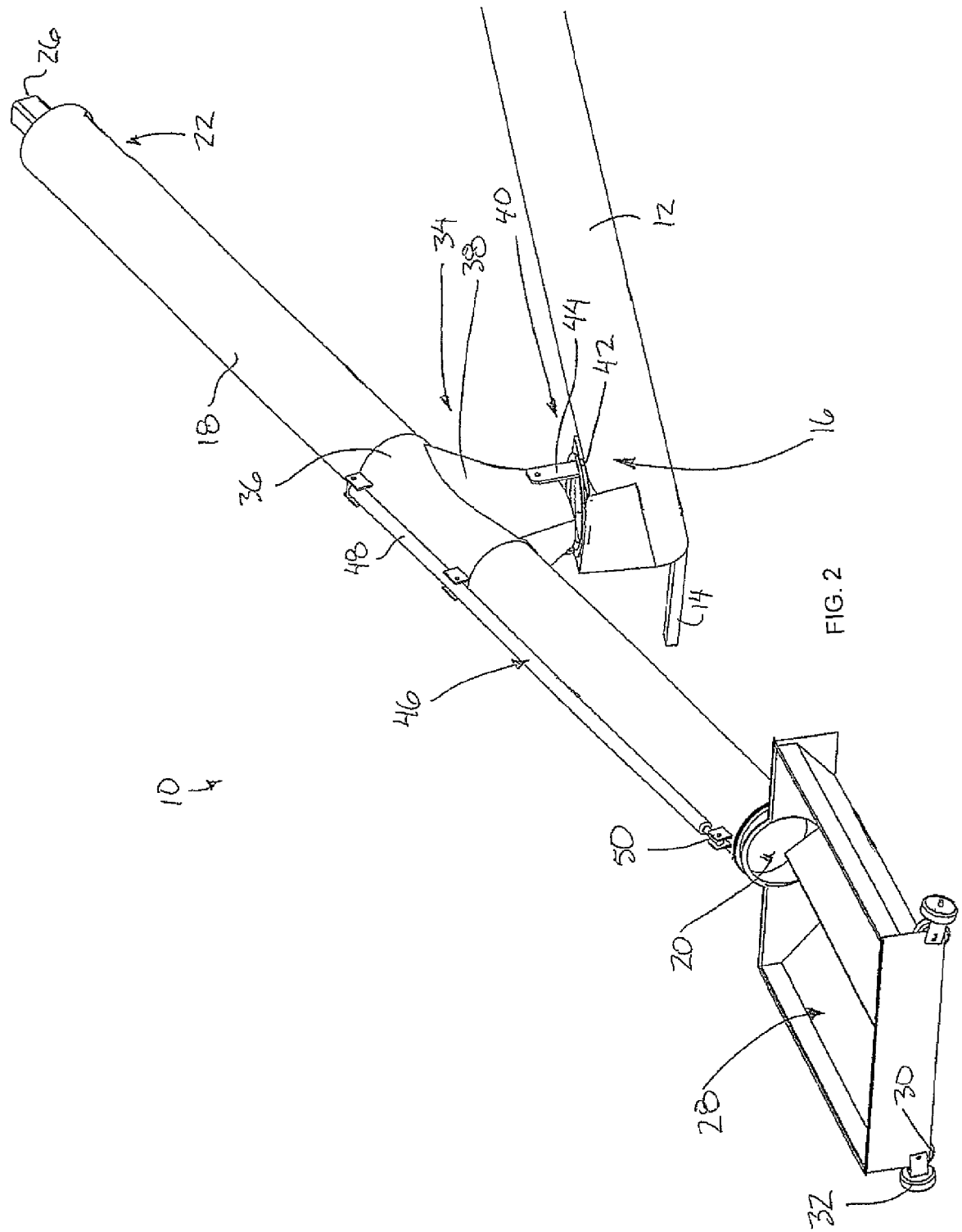
FIG. 2 is an alternate perspective view from the inlet end of the transfer conveyor according to FIG. 1 in a retracted position.

A sliding actuator 46 is provided for controlling relative sliding movement of the collector housing along the transfer tube such that the transfer conveyor is arranged for sliding movement in the longitudinal direction thereof between an extended position as shown in FIG. 1 and a retracted position as shown in FIGS. 2 and 3.

In the extended position the outlet opening of the transfer tube is aligned with the inlet opening of the collector housing so that driving rotation of the auger serves to convey particulate material from the inlet hopper at an upward incline through the transfer tube to be discharged into the inlet of the collector housing which then conveys the particulate material by gravity downwardly into the inlet opening of the main conveyor therebelow.

As shown in FIG. 13, when positioning a trailer 180 alongside the main conveyor or another source of particular material, rotation of the auger within the transfer tube can be stopped and the transfer tube can be retracted together with the transfer auger therein relative to the collector housing and the main conveyor upon which it is supported. In the retracted position the inlet hopper at the inlet end of the transfer tube is brought closer to the collector housing than in the extended position.

The distance between the collector housing and the inlet end of the transfer tube in the retracted position in the illustrated embodiments is approximately 40 to 75% of a distance between the collector housing and the inlet end of the transfer tube in the extended position.

More particularly the distance between the collector housing and the inlet end of the transfer tube in the retracted position is at least the same as the distance between discharge of the trailer 182 and the edge of the trailer allowing trailers to be positioned easily with the auger in the retracted position. Accordingly the trailer can be positioned somewhat parallel to and in somewhat close proximity alongside the main conveyor.

Once the trailer 180 is positioned with a pair of discharge chutes 182 in proximity to the inlet hopper, the transfer conveyor can be actuated into the extended position of FIG. 14 by outward movement of the inlet hopper in a lateral direction which may be generally perpendicular to the longitudinal direction of the trailer and the main auger to position the inlet hopper below the chutes 182. Once in the extended position, the inlet hopper is pivoted from the retracting mode to the swing mode to allow side to side rolling movement along the ground in the longitudinal direction of the trailer between the two longitudinally spaced chutes 182 as shown in FIGS. 15 and 16. Subsequently returning the transfer conveyor to the retracted position of FIG. 13 allows the trailer to depart in the longitudinal direction without moving the main conveyor or moving the transfer conveyor relative to the trailer.

Turning now more particularly to the first embodiment of FIGS. 1 through 3, the drive coupling 26 in this instance receives an input rotation from an auxiliary motor 100 arranged to be coupled directly at the outlet end of the transfer tube. The auxiliary motor 100 in a preferred embodiment comprises a hydraulic motor arranged to be driven by the hydraulic output of an agricultural implement, for example a tractor. In alternative embodiments, the auxiliary motor 100 may comprise an electric motor or any other suitable mechanical connection to an external drive.

According to the embodiment of FIGS. 1 through 3, as well as the second embodiment of FIGS. 4 through 7, the sliding actuator 46 in this instance comprises a linear hydraulic piston cylinder for controlling relative sliding movement between the collector housing and the transfer tube. The linear actuator extends in the longitudinal direction along the top side of the transfer tube from a cylinder end 48 coupled to the sleeve portion of the collector housing to a piston end 50 coupled to the inlet end of the transfer tube. The cylinder end 48 of the actuator is fixed to the sleeve portion 36 of the collector housing as two spaced apart positions in the longitudinal direction to ensure that the linear actuator remains parallel to the longitudinal axis of the auger and tube. The piston end 50 is anchored to the top of the transfer tube such that the linear actuator limits relative movement between the collector housing and the transfer tube to the linear sliding movement in the longitudinal direction while restricting relative pivotal movement therebetween about the longitudinal axis.

Turning now more particularly to the second embodiment of FIGS. 4 through 7, the drive transfer mechanism is arranged to couple the drive coupling 26 to the rotation of the auger of the main agricultural conveyor 12 such that the rotation of the auger comprises the input rotation which drives rotation of the transfer auger. In this instance a drive housing 102 surrounds the drive coupling 26 extending through the outlet end of the transfer tube and couples the drive coupling 26 to a first mating connector 104 of the drive transfer mechanism. The first mating connector is supported for rotation about an axis lying parallel to and spaced below the longitudinal axis of the transfer tube with the coupling 26 and the first mating connector 104 being connected by a suitable drive transmission including a drive chain or gears and the like. The first mating connector 104 includes a central socket formed therein which includes a plurality of circumferentially spaced slots oriented in a radial direction from a central aperture of the socket.

At the inlet end of the main agricultural conveyer 12 the main auger is coupled to a lower gear box 106 of the drive transfer mechanism. The lower gear box 106 is located within the main auger tube of the conveyor 12 in connection at an input shaft thereof with the main auger to drive the rotation thereof. An output of the lower gear box 106 is angled relative to the input thereof such that the output shaft 108 is arranged to be substantially vertical when the input of the gear box is coupled for rotation with the auger of the main conveyor 12 which extends at an upward incline from the inlet end to the outlet end of the conveyor.

The output shaft 108 of the lower gear box is coupled to a drive shaft which extends upwardly through the inlet opening of the conveyor 12 and through the bottom end of the hopper portion 38 of the collector housing 34 for connection to an upper gear box 110 received within the hopper portion. The upper gear box 110 is also angled such that the input of the upper gear box can be coupled to the substantially vertically oriented drive shaft from the output 108 of the lower gear box while the output shaft is oriented parallel and spaced below the longitudinal axis of the transfer tube. The drive shaft between the upper and lower boxes includes a suitable pivoting joint therebetween the permit some relative pivotal movement of upper gear box relative to the lower gear box in accordance with the pivot assembly 40 supporting the collector housing onto the tube of the main conveyor 12.

The output shaft 112 of the upper gear box has a length in the longitudinal direction of the transfer tube which is greater than the hopper portion of the collector housing so that opposing ends of the output shaft can be anchored by respective bearings 114 on longitudinally opposed end walls of the hopper portion 38. The bearings which rotatably support the output shaft at spaced positions on opposing sides of the gear box support the gear box within the hopper portion of the collector housing.

An upper end of the output shaft 112 nearest to the outlet end of the transfer tube extends axially outward beyond the wall of the hopper portion upon which it is supported to define a second mating connector 116 at the free end thereof which is arranged for mating connection with the first mating connector 104 at the outlet end of the transfer tube. The second mating connector comprises the end portion of the output shaft 112 with a plurality of circumferentially spaced projections thereon which are arranged for mating connection with the slots of the first mating connector in the manner of a conventional spline joint.

The first and second mating connectors connect with one another so as to be slidable in the direction of the longitudinal axis relative to one another as the collector housing is slidably displaced relative to the transfer tube between the retracted and extended positions thereof. The first mating connector remains in position at the outlet end of the transfer tube for movement together with the transfer tube relative to the collector housing. The second mating connector 116 remains fixed in longitudinal position relative to the collector housing during sliding movement of the collector housing relative to the transfer tube while remaining rotatable about the respective longitudinal axis of the output shaft relative to the housing.

In the illustrated embodiment, displacement of the collector housing into the extended position of the transfer tube causes the second mating connector 116 on the output shaft of the upper gear box to become automatically aligned and engaged with the first mating connector within the drive housing 102 at the outlet end of the transfer tube. As the transfer tube is displaced relative to the collector housing into the retracted position, the second mating connector is slidably removed in the axial direction from the first mating connector until the first and second mating connectors become disengaged with one another in the retracted position such that the main auger of the main conveyor 12 is arranged for rotation independently of the transfer auger.

In one alternative embodiment of the drive transfer mechanism, the output shaft 112 of the upper gear box may have a sufficient length to remain engaged with the drive member 104 in the drive housing 102 which rotates with the transfer auger. In this instance the output shaft maintains its position in the longitudinal direction relative to the transfer tube to extend alongside the transfer tube while the upper gear box is slidable along the output shaft 112 thereof together with the collector housing as the collector housing slides along the transfer tube. In this manner the output shaft 112 of the upper gear box comprises the first mating connector of the drive transfer mechanism while the gear box 110 comprises the second mating connector which is slidable relative to the first mating connector in the longitudinal direction between the extended and retracted position of the transfer tube. In this instance however the first and second mating connectors remain engaged with one another such that the transfer auger remains rotatable with the auger of the main conveyor 12 throughout displacement of the transfer tube between the extended and retracted positions thereof.

Another embodiment of the drive transfer mechanism is described further below with reference to the embodiment of FIGS. 8 through 11.

Figure 7:
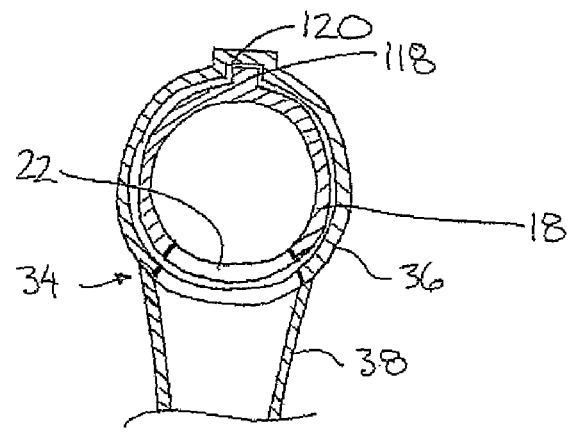
FIG. 7 is a sectional view of the transfer conveyor according to FIG. 4 at the outlet end of the transfer conveyor.
Figure 11:
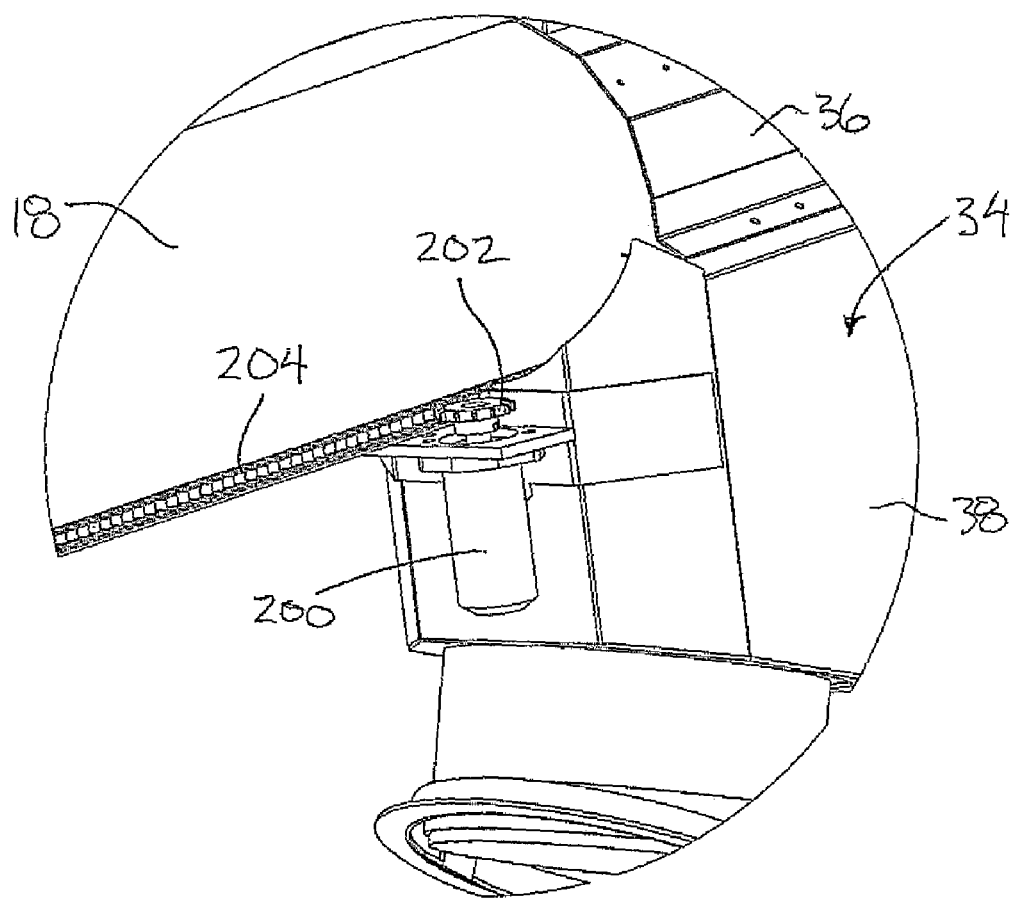
FIG. 11 is an enlarged perspective view of the transfer conveyor sliding actuator of FIG. 10.
Figure 10:
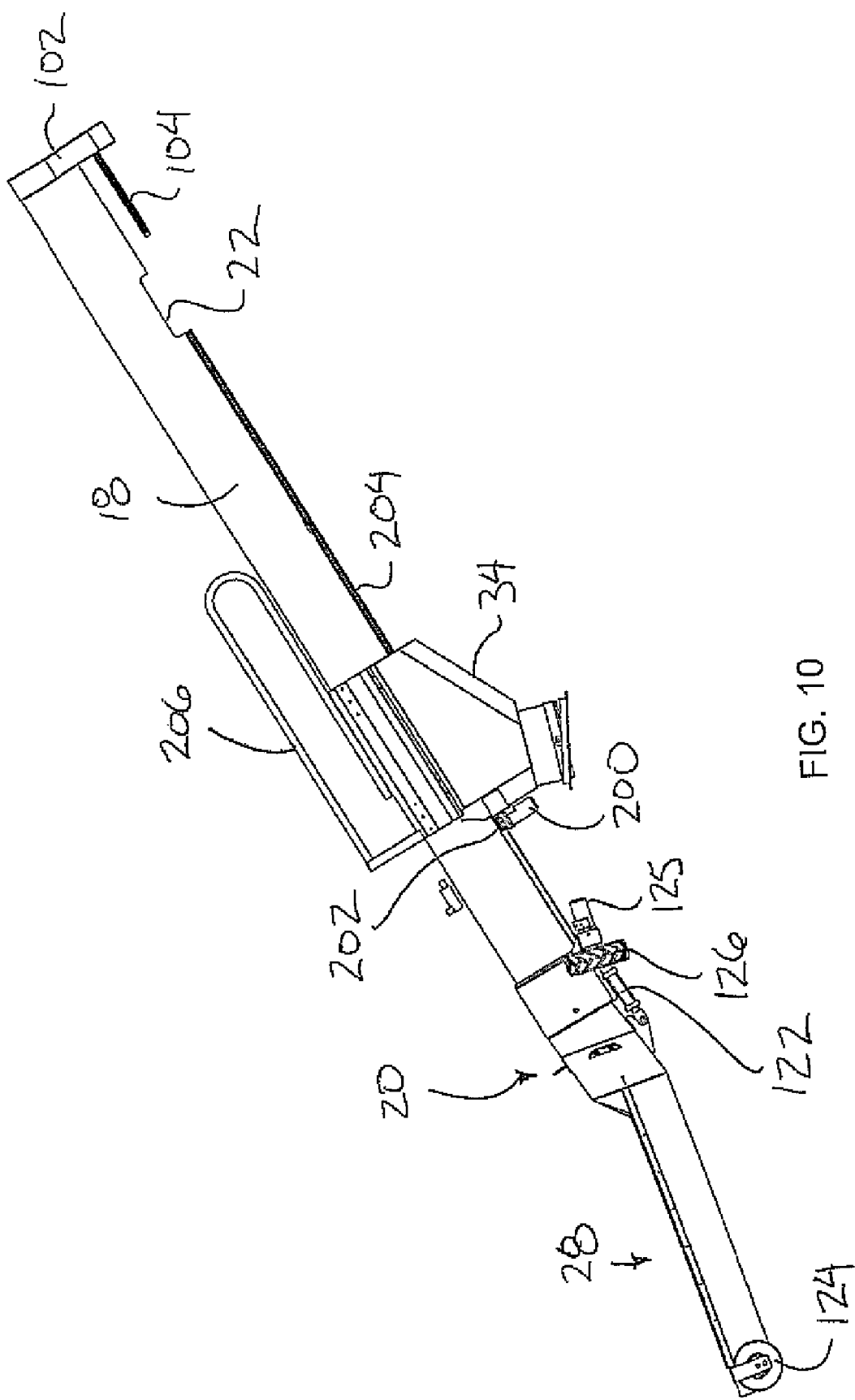
FIG. 10 is a side elevational view of the inlet hopper in a retracting mode according to the second embodiment of the transfer conveyer in the retracted position.
Figure 12:
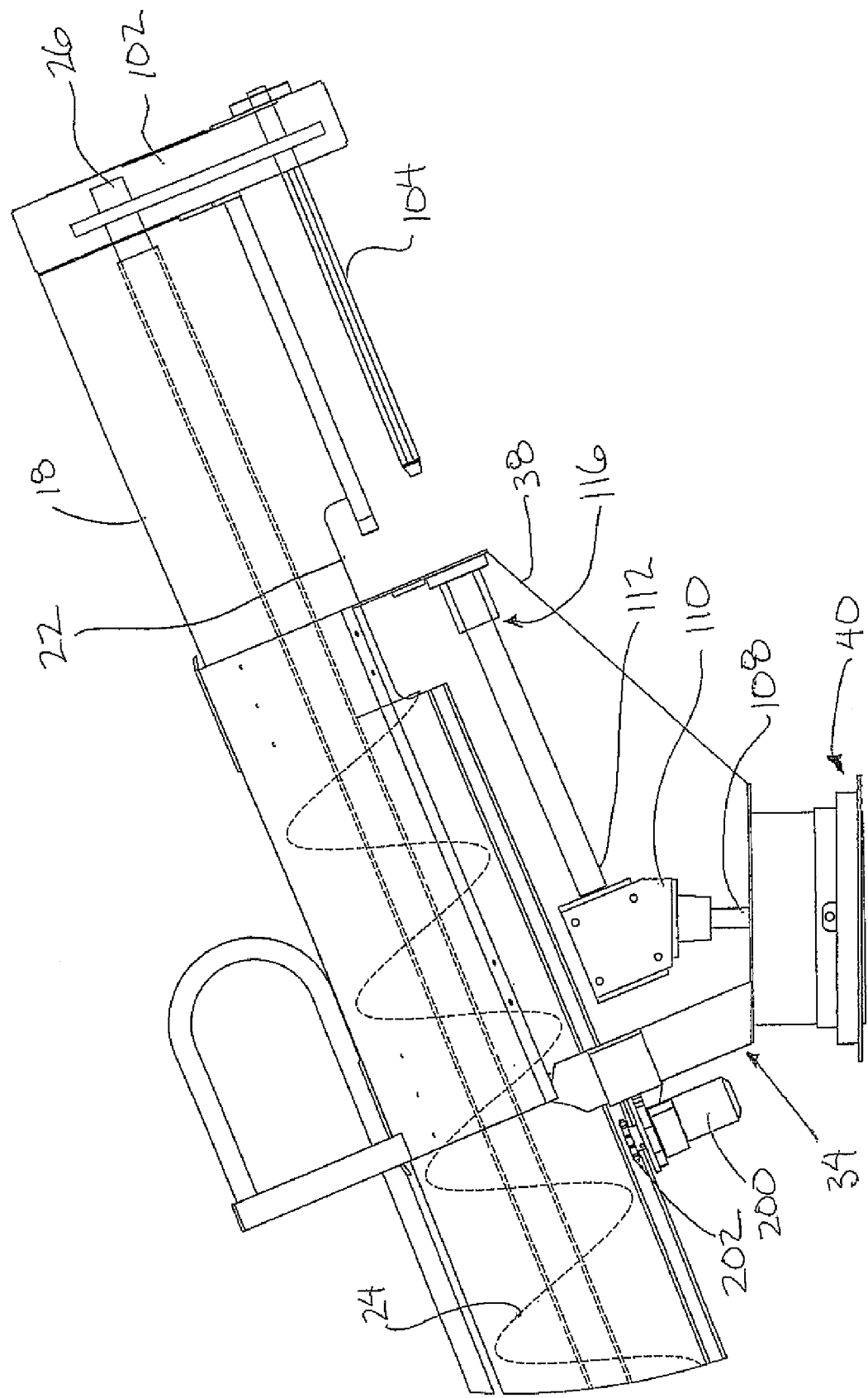
FIG. 12 is a side elevational view of the collector housing according to the second embodiment in which a side wall of the collector housing is shown removed to illustrate the drive transfer mechanism of the second embodiment.

As shown in FIG. 7, according to the second embodiment the sleeve portion 36 of the collector housing is supported about the transfer tube 18 such that relative rotation therebetween about the longitudinal axis is prevented by interaction of a key 118 on the transfer tube and a keyway 120 formed in the sleeve portion 36 of the collector housing. The key 118 comprises a projection extending outwardly from the outer surface of the transfer tube to extend in the longitudinal direction therealong over a length of the transfer tube which corresponds to the range of travel of the collector housing along the transfer tube between the extended and retracted positions thereof.

The key is illustrated in FIG. 7 on a top side of the transfer tube opposite the outlet opening 22 in the bottom side thereof, however the key may be provided at any position about the circumference of the tube provided that the mating keyway 120 is similarly located for mating connection therewith. The keyway 120 in each instance comprises a groove formed in the inner surface of the sleeve portion which receives the key 118 therein in which the groove extends in the longitudinal direction across the length of the sleeve portion 36 in the longitudinal direction to maintain the relative movement between the transfer tube and the collector housing in the longitudinal direction while restricting relative rotation therebetween about the longitudinal axis.

In further embodiments, any mating cross section of transfer tube and surrounding sleeve portion which prevent relative rotation therebetween while permitting relative longitudinal sliding can be used in place of the key and keyway to achieve the same functional benefits.

Turning now to FIGS. 8 through 11, a further embodiment of the transfer conveyor is shown in which the inlet hopper is movable relative to the transfer tube between a retracting mode and a swing mode. The inlet hopper in this instance again comprises an open top end for receiving material deposited therein and a plurality of pickup augers rotatable within the inlet hopper to guide material towards the outlet at a rear end of the inlet hopper housing. The pickup augers are driven by rotation of the transfer auger relative to the transfer tube.

The inlet hopper of FIGS. 8 through 11 differs from the previous embodiments in that the inlet hopper is hinged at the outlet end about a generally horizontal axis oriented perpendicularly to the longitudinal direction relative to the inlet end of the transfer tube on which it is supported. The pivotal movement is controlled by a suitable actuator 122 which pivots the hopper relative to the transfer tube between a first position shown in FIG. 8 and a second position shown in FIG. 9.

Two first wheels 124 are supported spaced apart on the front end of the hopper at opposing sides of the inlet hopper opposite the outlet at the rear end of the hopper. The wheels 124 comprise idler wheels which are fixed to support the hopper for rolling movement along the ground in the longitudinal direction of the tube. Accordingly the first wheels 124 support the hopper for rolling movement on the ground in a retracting of the actuator 122 for movement between the extended and retracted positions of the auger.

The hopper also includes a set of second wheels 126 which comprise drive wheels and which are spaced apart at opposing sides of the inlet hopper adjacent the outlet end thereof so as to be opposite the first wheels 124. The second wheels support the inlet hopper for rolling movement in a lateral direction across the ground which is perpendicular to the longitudinal direction of the transfer tube.

A swing drive 125 is provided at the outlet end of the inlet hopper for connection to the drive wheels 126 to selectively drive the rotation thereof along the ground and in turn drive the side to side swinging motion of the inlet hopper in a lateral direction, for example between the positions of FIGS. 14 and 15. The swing drive thus drives the pivoting movement of the transfer tube relative to the main conveyor about the vertical pivot axis at the swivel connection 42 between the outlet end of the transfer tube and the inlet end of the main conveyor.

The inlet hopper actuator 122 comprises a linear actuator including a cylinder and anchor on the inlet of the transfer tube and a piston end anchored into the inlet hopper such that retraction of the actuator 122 causes the front end of the hopper to be lowered relative to the outlet end and such that the first wheels 124 engage the ground and the second wheels 126 become disengaged from the ground in the retracting mode of FIG. 8.

Alternatively by extending the actuator 122, the inlet hopper is tilted about the lateral axis thereof relative to the inlet end of the transfer tube to raise the front end of the hopper relative to the rear end and thus lower the rear end of the hopper locating the outlet and the second wheels relative to the front end of the hopper supporting the first wheels 124 thereon such that the second wheels become engaged with the ground to support the hopper for rolling movement in the lateral direction in the swing mode of the transfer conveyor.

When the first wheels are fixed for rolling movement in the longitudinal direction of the transfer tube, the front end of the hopper is tilted upwards relative to the rear end such that the first wheels are disengaged with the ground in the swing mode. Alternatively, when the first wheels 124 comprise caster wheels, the caster wheels can remain engaged with the ground in the swing mode and are automatically pivoted for rolling movement in the lateral direction together with the second wheels.

In yet further embodiments, the second wheels may be mounted at the front end of the inlet hopper opposite the outlet end such that the inlet hopper is supported in a swing mode when the front end is lowered to the ground and the outlet end of the hopper is spaced upwardly in relation thereto. In this instance the first wheels which support the hopper for rolling in the longitudinal direction are located at the outlet end of the hopper.

The embodiment of FIGS. 8 through 11 is further distinguished from the previous embodiments in that the transfer tube sliding actuator 46 in this instance comprises a hydraulic orbit motor 200 for rotating a pinion gear 202 relative to a rack 204 to actuate the sliding movement of the transfer tube between extended and retracted positions.

The rack 204 is supported along the bottom side of the transfer tube along the full length of the sliding movement of the collector housing between the extended and retracted positions. The rack comprises a track locating a plurality of evenly spaced apart teeth aligned sequentially with one another in the longitudinal direction.

The pinion gear 202 is supported rotatably on the collector housing at a front side nearest the inlet hopper for rotation about an upright axis oriented perpendicularly to the longitudinal direction of the transfer tube. The pinion gear is mounted on the output shaft of the motor 200 for rotation therewith relative to the collector housing upon which the motor is supported. The motor 200 comprises a hydraulic motor arranged to be coupled to the hydraulic supply of a tractor or other suitable machinery for example. The pinion gear includes teeth which similarly spaced apart as the teeth on the rack for meshing engagement therewith such that rotation of the pinion gear by the motor 200 causes the pinion gear to be displaced along the rack which in turn causes the collector housing to be slidably displaced along the transfer tube between the extended and retracted positions thereof.

The hydraulic orbit motor of the swing drive 125 may be similarly driven with hydraulic fluid from a hydraulic supply of a tractor or other similar equipment.

A suitable flexible track 206 is mounted along the top side of the transfer tube for guiding the position of hydraulic fluid delivery hoses which communicate between the moving components of the transfer conveyor and the components which are fixed in relation to supporting equipment.

The embodiment of FIGS. 8 through 11 is further distinguished from the previous embodiments in that the first mating connector 104, which is supported on the drive housing 102 and coupled to rotate with the drive coupling 26, instead comprises a shaft with splines thereon. The shaft defining the first mating connector 104 is rotatably supported at a top end on the drive housing and is rotatable about a longitudinal axis thereof extending downwardly alongside and spaced below the transfer tube in parallel relation therewith. The lower free end of the shaft defining the first mating connector 104 is tapered for insertion into the second mating connector 116 at the upper end of the output shaft 112 of the upper gear box 110.

The second mating connector 116 in this instance comprises a hollow tube with a splined portion at the upper end thereof which mates with the splines on the first mating connector so that the first and second mating connectors are slidable in the longitudinal direction with one another, but remain rotatable together with one another about the longitudinal axis when engaged with one another.

The shaft of the first mating connector 104 thus comprises the driven member of the sliding connection and is connected through the drive housing 102 to rotate with the transfer auger. As in the previous embodiments, the first mating connector 104, which comprises a driven shaft in this instance, maintains its position in the longitudinal direction relative to the transfer tube to extend alongside the transfer tube. The second mating connector 116, comprising a hollow tube with an internally splined portion in this instance, is again attached to the upper gear box and is slidable along the shaft of the first mating connector together with the collector housing as the collector housing slides along the transfer tube.

The first and second mating connectors can remain engaged with one another such that the transfer auger remains rotatable with the auger of the main conveyor 12 throughout displacement of transfer tube and outlet opening 22 through a range of aligned position relative to the collector housing in the extended position thereof for any given length of driven member and matching length of hollow tube.

In further embodiments, the collector housing may be varied in configuration to comprise an adaptor collar arranged to mount onto the inlet of various implements, for example a grain bagger. In this instance the adapter collar is connected to the inlet of the grain bagger using a similar pivot assembly 40 permitting relative pivotal movement about respective horizontal and vertical axes. The mounting portion of the collector housing in this instance may comprise a carriage adapted for sliding movement along a track mounted on the transfer tube to extend in the longitudinal direction thereof instead of the mounting portion comprising a sleeve surrounding the transfer tube as in the previous embodiments.

In yet further embodiments, the swing drive 125 or other actuators or motors of the present invention may comprise electric motors or other suitable electrically driven actuators.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A transfer conveyor comprising:
    a transfer tube extending in a longitudinal direction between an inlet opening at an inlet end of the transfer tube and an outlet opening at an outlet end of the transfer tube;
    a transfer auger supported in the transfer tube for rotation about a longitudinal axis extending in the longitudinal direction of the transfer tube;
    a transfer drive mechanism arranged to drive rotation of the transfer auger about the longitudinal axis relative to the transfer tube so as to convey material from the inlet opening to the outlet opening of the transfer tube responsive to an input rotation;
    a collector housing comprising a passage extending therethrough from an inlet opening to an outlet opening;
    the collector housing being supported for relative sliding movement along the transfer tube in the longitudinal direction of the transfer tube between an extended position in which the inlet opening of the collector housing communicates with the outlet opening of the transfer tube and a retracted position in which the collector housing is closer to the inlet end of the transfer tube than in the extended position.

2. The transfer conveyor according to claim 1 wherein the transfer auger is fixed in the longitudinal direction relative to the transfer tube.

3. The transfer conveyor according to claim 1 wherein there is provided an inlet hopper having an open top end arranged to receive material therein and an outlet in communication with the inlet opening of the transfer tube, the auger being fixed in the longitudinal direction relative to the inlet hopper.

4. The transfer conveyor according to claim 1 wherein the collector housing has a length spanning in the longitudinal direction which is greater than the outlet opening of the transfer tube.

5. The transfer conveyor according to claim 1 wherein the inlet opening of the collector housing is longer in the longitudinal direction than the outlet opening of the transfer tube.

6. The transfer conveyor according to claim 1 wherein the collector housing comprises:
    a mounting portion supported on the transfer tube for sliding movement along the transfer tube in the longitudinal direction, the mounting portion locating the inlet opening of the collector housing so as to be arranged for alignment with the outlet opening of the transfer tube; and
    a hopper portion defining the passage of the collector housing extending downwardly from the inlet opening in the sleeve portion to the outlet opening at a bottom end of the hopper portion.

7. The transfer conveyor according to claim 1 wherein there is provided an inlet hopper having an open top end arranged to receive material therein and an outlet in communication with the inlet opening of the transfer tube, the inlet hopper being arranged to be supported for rolling movement along the ground in the longitudinal direction of the transfer tube.

8. The transfer conveyor according to claim 1 wherein the outlet opening of the transfer tube is provided an inlet hopper having an open top end arranged to receive material therein and an outlet in communication with the inlet opening of the transfer tube, the inlet hopper being arranged to be supported for rolling movement along the ground in a lateral direction oriented substantially perpendicularly to the longitudinal direction of the transfer tube.

9. The transfer conveyor according to claim 1 further comprising:
   an inlet hopper having an open top end arranged to receive material therein and an outlet in communication with the inlet opening of the transfer tube;
   the inlet hopper being supported on a first set of wheels for rolling movement along the ground in the longitudinal direction of the transfer tube;
   the inlet hopper being supported on a second set of wheels for rolling movement along the ground in a lateral direction oriented substantially perpendicularly to the longitudinal direction of the transfer tube; and
   an actuator supported on the inlet hopper and being operable between a first position in which the inlet hopper is supported for rolling movement on the first set of wheels and a second position in which the inlet hopper is supported for rolling movement on the second set of wheels.

10. The transfer conveyor according to claim 9 wherein the first and second sets of wheels are supported at opposing ends of the inlet hopper and wherein the inlet hopper is supported on the transfer tube for relative pivotal movement about a generally horizontal actuator axis between the first and second positions.

11. The transfer conveyor according to claim 1 wherein the outlet opening of the transfer tube is located on a bottom side of the transfer tube.

12. The transfer conveyor according to claim 1 wherein the transfer drive mechanism is arranged to communicate with the transfer auger through the outlet end of the transfer tube.

13. The transfer conveyor according to claim 1 wherein there is provided an auxiliary motor coupled to the transfer drive mechanism to provide the input rotation to the transfer drive mechanism.

14. The transfer conveyor according to claim 1 in combination with a main conveyor comprising a main auger rotatable within a main auger tube to convey material upwardly from an inlet end to an outlet end of the main conveyor wherein the collector housing is arranged to be coupled to the input end of the main conveyor and the transfer drive mechanism is arranged to be coupled to the main auger of the main conveyor such that the input rotation of the transfer drive mechanism comprises a rotation of the main auger.

15. The transfer conveyor according to claim 14 wherein the transfer drive mechanism comprises a first mating connector coupled for rotation with the transfer auger and a second mating connector coupled for rotation with the main auger and which is movable together with the collector housing relative to the transfer tube, the first and second mating connectors being coupled for rotation together in the extended position of the transfer tube and being slidable relative to one another between the extended position and the retracted position of the collector housing.

16. The transfer conveyor according to claim 15 wherein the second mating connector is movable together with the collector housing relative to the first mating connector between the extended position in which the first and second mating connectors are in an engaged position within one another and the retracted position in which the first and second mating connectors are disengaged with one another in a disengaged position such that the main auger is rotatable independently of the transfer auger.

17. The transfer conveyor according to claim 1 wherein a distance between the collector housing and the inlet end of the transfer tube in the retracted position is approximately 40 to 75% of a distance between the collector housing and the inlet end of the transfer tube in the extended position.

18. The transfer conveyor according to claim 1 in combination with a main conveyor supported by a wheeled frame for rolling movement along the ground, the main conveyor extending upwardly from an inlet opening to an outlet opening, the outlet opening of the collector housing being coupled to communicate with the inlet opening of the main conveyor, and the transfer tube and the transfer auger being slidable together in the longitudinal direction relative to the collector housing and the main conveyor.

19. The transfer conveyor according to claim 18 wherein the collector housing is coupled to the main conveyor for relative pivotal movement about a substantially horizontal axis.

20. The transfer conveyor according to claim 18 wherein the collector housing is supported on the main conveyor such that the transfer tube is slidable in the longitudinal direction of the transfer tube which extends upwardly at an incline from the inlet end to outlet end.

* * * * *